United States Patent

Hayashi et al.

[19]

[11] Patent Number: 4,691,899
[45] Date of Patent: Sep. 8, 1987

[54] APPARATUS FOR REACTOR IRON MAKING

[75] Inventors: Kiyohide Hayashi; Saburo Sugiura, both of Aichi; Noboru Demukai, Gifu, all of Japan

[73] Assignee: Daido Tokushuko Kabushiki Kaisha, Aichi, Japan

[21] Appl. No.: 748,280

[22] Filed: Jun. 24, 1985

[30] Foreign Application Priority Data

Jun. 29, 1984 [JP] Japan ................... 59-134479
Jun. 29, 1984 [JP] Japan ................... 59-134659
Jun. 29, 1984 [JP] Japan ................... 59-134660

[51] Int. Cl.$^4$ ........................................... F27D 17/00
[52] U.S. Cl. .................................... 266/140; 266/144; 266/900
[58] Field of Search ............... 266/140, 143, 144, 156, 266/218, 900; 75/43, 44 R, 44 S, 46, 38

[56] References Cited

U.S. PATENT DOCUMENTS

| | | | |
|---|---|---|---|
| 2,345,502 | 3/1944 | Reece | 266/165 |
| 3,198,623 | 8/1965 | Evans et al. | 266/183 |
| 3,630,719 | 12/1971 | Craig | 75/43 |
| 3,796,326 | 3/1974 | Buhrer | 266/900 |
| 3,958,919 | 5/1976 | Kjell-Berger | 266/156 |
| 4,382,584 | 5/1983 | Liedtke | 266/176 |

*Primary Examiner*—Melvyn J. Andrews
*Attorney, Agent, or Firm*—Armstrong, Nikaido, Marmelstein & Kubovcik

[57] ABSTRACT

An improved apparatus for reactor iron making has a furnace body to melt raw material, typically as scrap, a shaft to heat the raw material, and a raw material supply bucket, these three components being arranged vertically, with an exhaust gas combustion tower positioned close to the shaft.

Raw material is supplied to the shaft with this apparatus by the bucket, and, after being heated by exhaust gas from the furnace body, the raw material is charged into the furnace body by the opening/closing operation of a shaft damper and a furnace body cover.

Exhaust gas is introduced from the furnace body into the combination tower, air is supplied in stages, the temperature of the gas is gradually raised through combustion of CO, and the gas is used to heat the raw material in the shaft.

5 Claims, 5 Drawing Figures

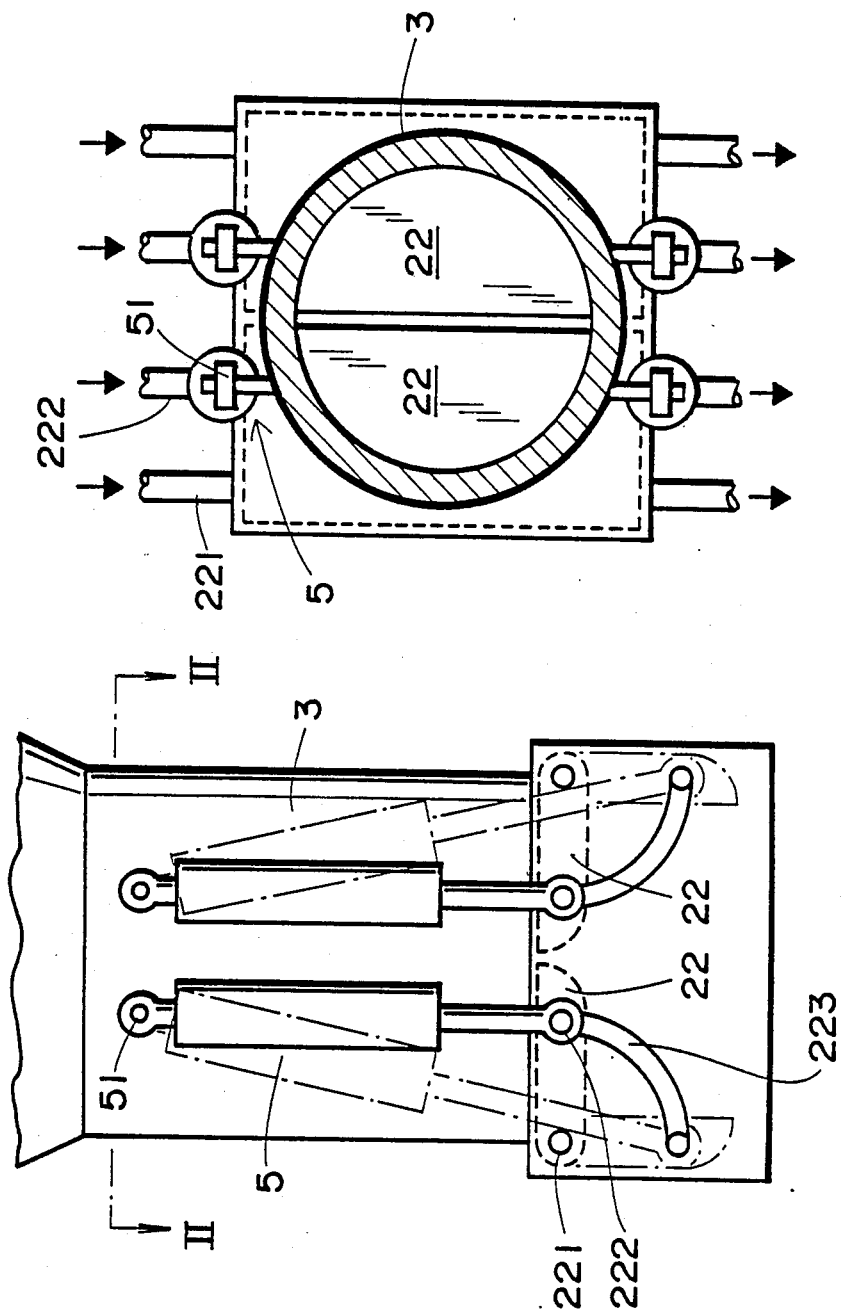

APPARATUS FOR REACTOR IRON MAKING

BACKGROUND OF THE INVENTION

1. Field of the Invention

The present invention relates to improved reactor iron making. Specifically, the present invention relates to an apparatus for reactor iron making that has a highly rationalized arrangement, and to methods of supplying raw material and utilizing exhaust gas when the apparatus is used for reactor iron making.

2. State of the Art

We have previously established a technique of making iron (meant here to include pig iron and steel) by melting scrap using carbonaceous materials and oxygen, rather than using electric power or coke, and named it "Reactor Iron Making", which was disclosed in Japanese Patent Disclosure No. 57-198206.

With this method not only scrap but also reduced iron can be used as the raw material, and optimum operating conditions in the case of reduced iron have been determined as disclosed in Japanese Patent Application No. 59-35842.

The basic method of "Reactor Iron Making" involves charging the reactor, containing molten iron and an air space above it, with scrap and carbonaceous material, and blowing oxygen through the molten iron to stir it and oxidize the carbonaceous material mainly to CO. Oxygen is also blown into the above-mentioned air space above the molten iron to oxidize CO to $CO_2$. Heat generated by the oxidation melts the scrap, and the high temperature exhaust gas is utilized for preheating charged scrap.

Through further research the advantages of a method of using the heating of the charged scrap became clear. More than the burning of gas, containing CO, in the air space of the reactor, the gas is extracted to the outside, air is added, and burning takes place, raising the temperature.

In the improved apparatus a scrap preheating shaft is positioned directly above the reactor, and the bottom of the shaft is provided with a damper that is closed during preheating in order to hold the scrap. The damper is opened to allow the scrap to fall directly into the reactor in such a way that charging is ensured regardless of the shape and size of the scrap. In order to prevent the damper from being damaged by heat, cooling water is passed through the interior, but if exposed to high temperature gas, life of the damper is short. It was effective to alter the waste gas passage to introduce the waste gas at the top of the scrap and remove it at the bottom, that is, so that the waste gas comes into contact with the damper after heating of the scrap when the temperature of the gas has decreased. However, damage to the damper cannot be ignored when it faces the reactor, because both sides absorb heat.

An apparatus for reactor iron making requires that every component inclusive of the above-noted parts be durable and long lasting. Improvement in heat efficiency is also a continual problem, and heat loss must be reduced. A guarantee of airtightness is important. It is necessary to charge the heating shaft with raw material while maintaining an airtight condition because normally high temperature gas is introduced into the heating shaft. It is also necessary to charge the furnace body smoothly with the heated raw material under an airtight condition.

In order to exhibit the advantages of "Reactor Iron Making", it is essential to raise the level of heat utilization even more. Also, loss due to oxidation of the scrap must be avoided at all costs.

SUMMARY OF THE INVENTION

One object of the present invention is to provide an apparatus for reactor iron making which meets the above requirements, is easily manufactured and long lasting, conveniently operated and serviced, offers high utilization of heat, and has a highly rationalized construction.

An additional object of the present invention is to provide a method of supplying raw material when using the proposed apparatus to carry out reactor iron making in order to heat the raw material and move it to the furnace body while maintaining the above-mentioned airtight condition.

A third object of the present invention is to offer a method of utilizing exhaust gas to enable thorough heating of scrap while preventing oxidation, in the above-mentioned improved reactor iron making method.

DRAWINGS

The Drawings show one example of the apparatus for reactor iron making of the present invention, FIG. 1 being a side view, and FIG. 2 a vertical section taken on line I—I of FIG. 1.

FIGS. 3 and 4 illustrate the dampers as means for opening/closing and shock relief, as one portion of the raw material supply mechanism of the present invention, FIG. 3 being a side view, and FIG. 4 a transverse sectional view taken on line II—II of FIG. 3.

DETAILED DESCRIPTION OF PREFERRED EMBODIMENTS

Figure 2:
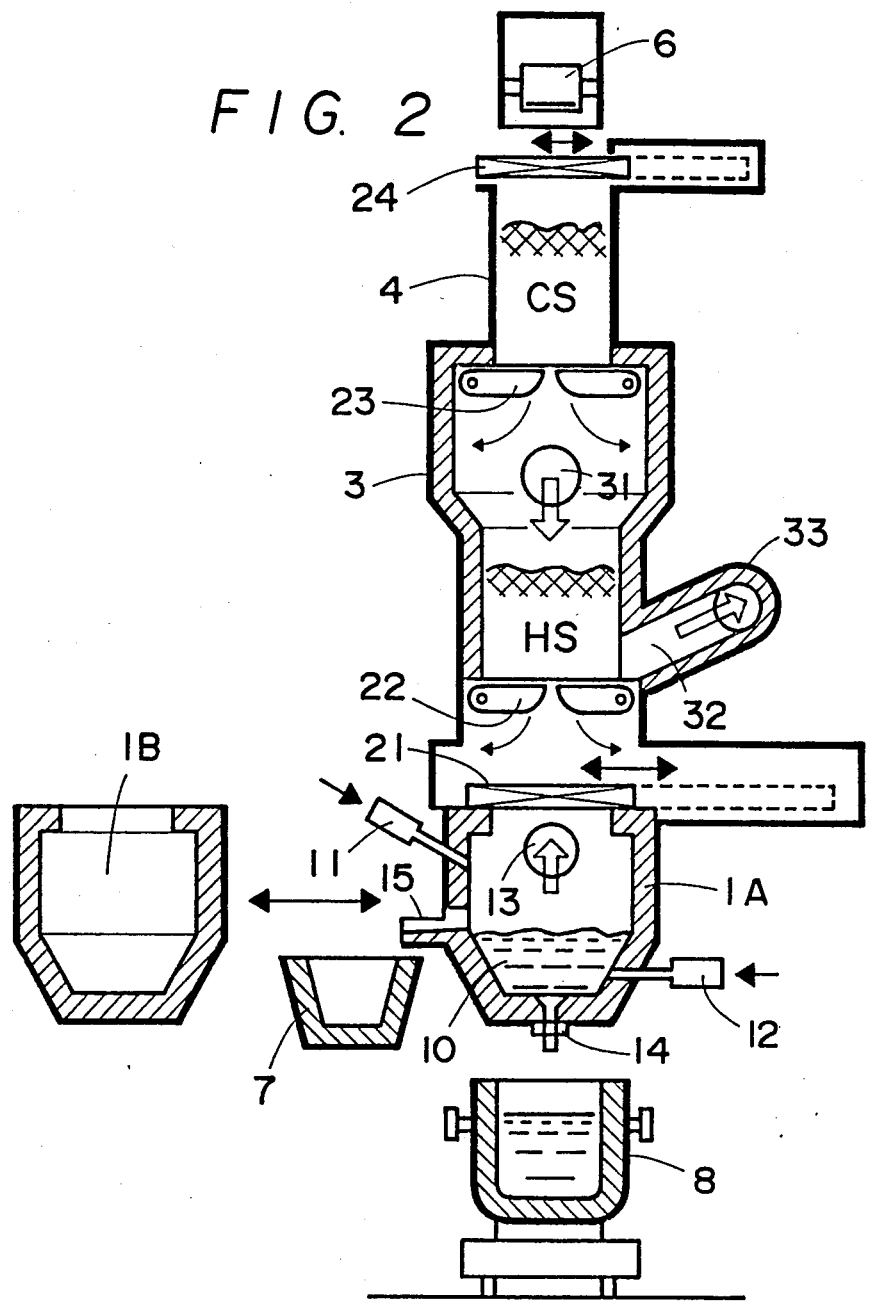

The apparatus for reactor iron making of the present invention, as shown in the Drawings, comprises furnace body 1A provided with a cover 21 that is open when the furnace body is charged with material to be melted, tuyeres for blowing in carbonaceous powder and oxygen, shown in FIG. 2 as upper tuyere 11 and lower tuyere 12, and waste gas outlet 13; heating shaft 3 having in its upper portion combustion gas inlet 31, in its lower portion air duct 33 connected to combustion gas outlet 32, and into which a raw material is intermittently charged, heated by the heat of combustion gas while being held in the shaft, and transferred to the above-mentioned furnace body; raw material bucket 4 which periodically supplies raw material to the above-mentioned heating shaft, with the furnace body, heating shaft, and raw material bucket being arranged nearly vertically; gas combustion tower 5, close to the heating shaft, with air introducing slits 51, gas combustion tower inlet 52 connected to waste gas outlet 13 of the above-mentioned furnace body; and gas combustion tower outlet 53, which is connected to combustion gas inlet 31 of the above-mentioned heating shaft.

When carbon on a carrier gas, from the upper tuyere, and oxygen, from the lower tuyere, are blown into furnace body 1A containing molten iron 10, heat generated through combustion of C melts the charged material, and gas containing CO is released. This gas passes into combustion tower 5. When air is blown in, CO is burned to be $CO_2$ and raise the temperature of the gas, which is introduced into heating shaft 3 from combustion gas inlet 31 to heat scrap HS. Gas spent in the heating of HS is sent to a dust collector via waste gas duct 33. Cover 21 and damper 22 are opened, and the heated scrap HS is charged into the furnace body. Cover 21 and dampers 22 and 23 are in contact with high temperature gas, but only on one side, so that damage by heat is negligible and they are long lasting.

Furnace body 1A should preferably be a vertical, cylindrical shape, as shown in the Drawings, for ease of construction and maintenance, and in order to minimize heat loss. It is preferable to provide a sliding-gate-type molten iron tapping nozzle 14 at or near the bottom of the furnace body so that it need not be tilted to release the molten iron, and a taphole 15 on the side of the furnace, as a slag waste outlet. Numerical reference 7 is a slag pan.

The furnace body is supported by, for example, rails 9, so that it can be convenientty moved horizontally (left and right in FIG. 2) and positioned directly under heating shaft 3. Preparation of two furnace bodies 1A and 1B is recommended so that while one is being used the other can be repaired.

Tapping of the molten iron through the sliding gate is effectively carried out, as shown in the Drawings, by moving a ladle 8 on a flatcar under the furnace body to receive the molten iron. A simplified facility is possible when implemented in combination with the above-mentioned furnace body slide, and by the fact that the use of a crane is completely unnecessary.

The method of supplying raw material for reactor iron making of the present invention, using the above-mentioned apparatus for reactor iron making, comprises the following steps:

(a) damper 23 at the bottom of raw material bucket 4 is closed, cover 24 at the top of the bucket is opened, and a predetermined amount of raw material is charged into the bucket from conveyor 6;

(b) damper 22 at the bottom of heating shaft 3 is closed, bucket cover 24 is closed, and damper 23 is opened so that raw material CS in the bucket may drop into heating shaft 3;

(c) bucket damper 23 is closed, combustion gas is introduced into heating shaft 3 from gas inlet 31 to heat the raw material, exhaust gas exits from outlet 32, while during this time bucket cover 24 is opened for charging the next batch of raw material;

(d) heating shaft damper 22 and furnace body cover 21 are opened, heated raw material HS is charged into furnace body 1, and heating shaft damper 22 and furnace body cover 21 are closed; and (e) repetition of steps b, c, and d.

Heating of the raw material is carried out and the heat is thoroughly utilized, while maintaining an airtight condition, by supplying the raw material based on the above operation of the govers and dampers.

Figure 1:
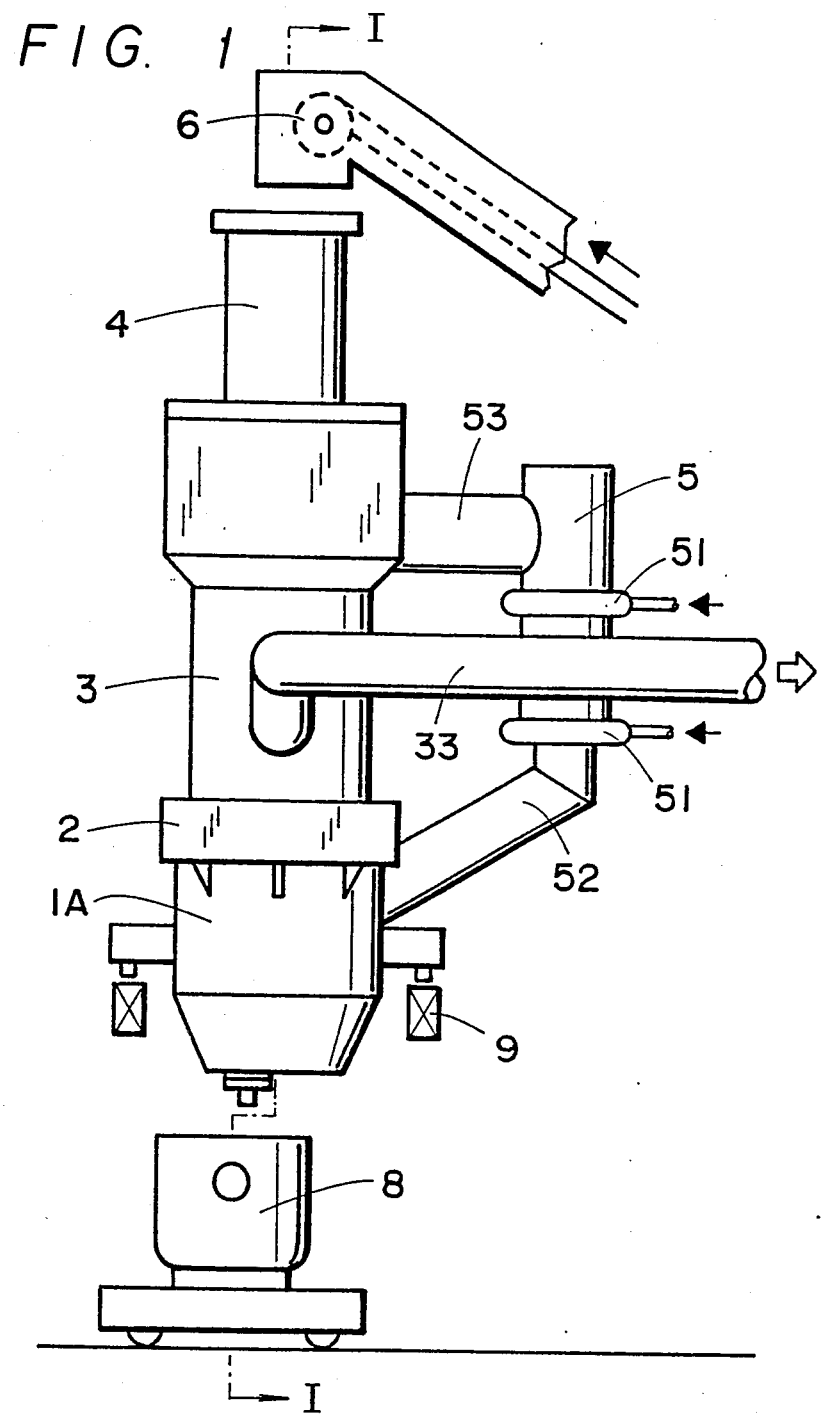

A slide system as shown in FIG. 1, being compact, is recommended for covers 21 and 24 of the reactor iron making apparatus, while a folding door system, as shown in the FIGURES, ennables smooth operation of, and is recommended for, dampers 22 and 23. These dampers use a hydraulic mechanism, as shown in FIGS. 3 and 4, and, in addition to the opening/closing operation, are also desirably used to relieve the shock of dropping caused by charging the raw material.

The example in the FIGURES employs a hydraulic cylinder to perform the opening/closing and shock relief operations of damper 22 at the bottom of the heating shaft. The hydraulic cylinder is fixed at fulcrum 51, which is outside the heating shaft wall, and is in the position shown by the solid line when the damper is closed to relieve the shock of raw material being charged. It moves to the postion shown by the chain line to open the damper. In addition, cooling water is circulated within the damper by using fixed spindle 221 and mobile spindle 222. A passageway 223 for mobile spindle 222, covered with a coverplate (not shown in the FIGURE), maintains airtightness.

Scrap and slag-making agents should by charged as raw materials to be melted. Shredding, briquette, lathe shavings, and numerous other materials can be used as scrap. It is also possible to substitute all or a portion of the scrap with reduced iron. A typical slag-making agent is CaO, and, especially, the use of CaO powder is recommended. At the beginning of each raw material supply step, powdered CaO is charged so as to fill the gaps in the dampers and airtightness is effectively achieved.

Figure 5:
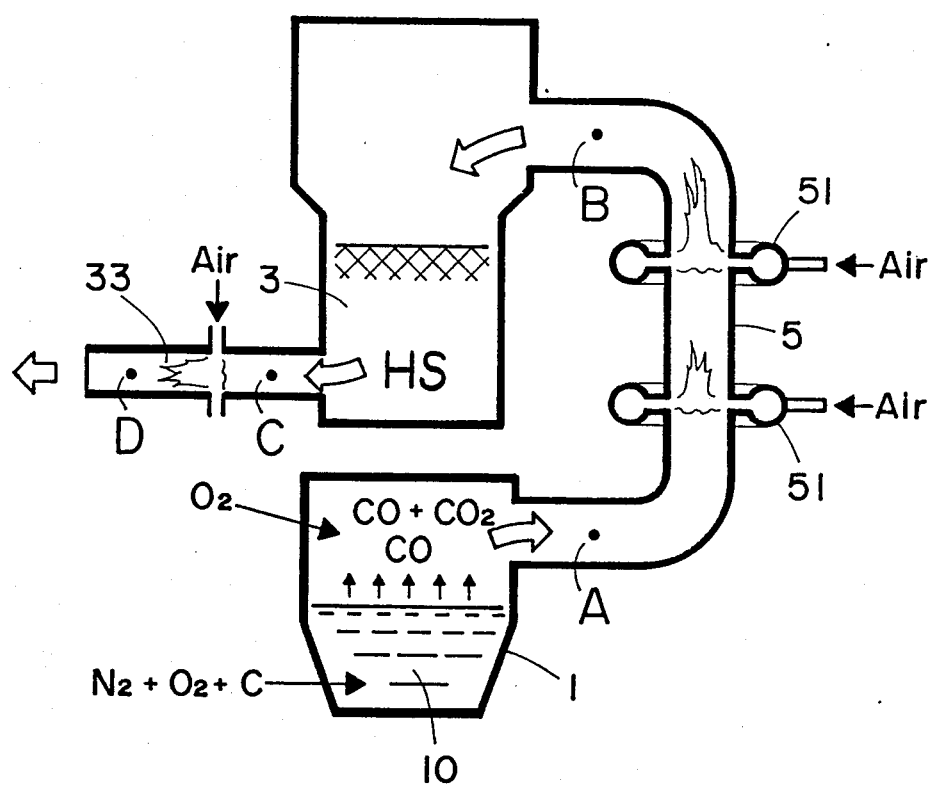
FIG. 5 is a conceptual view corresponding to FIG. 1, illustrating the method of utilizing exhaust gas of the present invention.

Reactor iron making involves charging scrap into furnace body 1 containing molten iron 10, blowing in carbonaceous material C and oxygen, burning C and using the heat of combustion to melt the scrap, adding air to gas containing a large amount of CO and burning the gas to raise its temperature, and heating the charged scrap HS by utilizing the high temperature gas. The method of utilizing exhaust gas in reactor iron making of the present invention, as shown in FIG. 5, comprises introducing exhaust gas, containing a large amount of CO, into gas combustion tower 5 that has a lining of refractory heat insulating material and plural rows of air inlets 51, gradually adding air containing $O_2$ of an amount slightly less than equivalent to CO, and burning the CO so that the exhaust gas reaches its highest temperature immediately before coming into contact with the scrap, at point B of FIG. 5, and adding air containing a small surplus of $O_2$ to the exhaust gas after the heating of scrap HS to completely burn the remaining CO.

Use of air containing $O_2$ of an amount slightly less than equivalent to CO for the burning of CO avoids the possible oxidation of Fe at high temperature. Also, gradual addition of the air is carried out for the purpose of preventing loss of heat as apparent heat due to the sudden rise of the temperature of the exhaust gas. By adding air containing a small surplus of $O_2$ to the exhaust gas after heating of the scrap, the remaining CO is burned to make the exhaust gas nonpoisonous and to cause a further rise in the temperature. This exhaust gas is still at a high temperature and is worth utilizing.

EXAMPLE

Using the apparatus constructed as shown in the FIGURES, reactor iron making was carried out by adding air in equal amounts from the two rows of inlets into the gas combustion tower to cause burning, and the scrap was heated. Air containing about two times as much $O_2$ in relation to the equivalent of remaining CO was added to the exhaust gas after heating of the scrap.

Composition, temperature, and flow (flow at that temperature and normal state) of the gas at points A, B, C, and D of FIG. 5 were measured and the results are shown below.

|   | A | B | C | D |
|---|---|---|---|---|
| (Gas Composition - %) | | | | |
| CO | 38.2 | 8.6 | 8.6 | 0 |
| $CO_2$ | 57.3 | 53.4 | 53.4 | 45.4 |
| $N_2$ | 4.5 | 38.0 | 38.0 | 51.4 |
| $O_2$ | 0 | 0 | 0 | 3.2 |
| (Gas flow - $Nm^3/Hr$) | | | | |
| CO | 1,536 | 534 | 534 | 0 |
| $CO_2$ | 2,304 | 3,306 | 3,306 | 3,840 |
| $N_2$ | 180 | 2,346 | 2,346 | 4,355 |
| $O_2$ | 0 | 0 | 0 | 267 |
| (Gas Temperature - °C.) | | | | |
|  | 1,500 | 2,485 | 1,188 | 1,215 |
| (Total Gas Flow - $m^3/Hr$) | | | | |
|  | 26,108 | 62,494 | 33,105 | 46,123 |

CO concentration of the gas prior to contact with the scrap is relatively high in order to provide for the change in composition of the exhaust gas leaving the furnace, but in a normal operation the amount of air added in the combustion tower should probably be regulated so that the amount of remaining CO is always 10% or less, by volume.

An apparatus for reactor iron making having long life and little heat loss is realized by employing the above-mentioned structure. Construction and servicing of this apparatus are easily carried out and reactor iron making is profitably implemented.

Smooth charging and thorough heating of raw material, while maintaining airtightness, can be carried out using the raw material supply method of the present invention.

When reactor iron making is put into practice by incorporating the method of utilizing exhaust gas of the present invention, high heating efficiency is achievable with no possibility of raw material oxidation.

We claim:

1. An apparatus for reactor iron making comprising:
   a furnace body provided with tuyeres for blowing into the furnace body carbonaceous powder and oxygen, a waste gas outlet attached thereto, and a cover positioned over the furnace body, the cover is opened when the furnace body is charged with material to be melted;
   a heating shaft above the furnace body and cover, the heating shaft provided with a combustion gas inlet in its upper portion, and a combustion gas outlet in its lower portion to which an air duct is connected so that combustion gas flows into the heating shaft from the upper inlet, and leaves the heating shaft from the lower outlet, and into which heating shaft a raw material is intermittently charged, heated by the heat of combustion gas flowing through the heating shaft, while being held in the shaft, and transferred to the above-mentioned furnace body;
   a raw material bucket positioned over the heating shaft which periodically supplies raw materials to the above-mentioned heating shaft, the furnace body, the heating shaft, and the raw material bucket being arranged nearly vertically; and
   a gas combustion tower closely adjacent to the heating shaft, the gas combustion tower being provided with air-introducing slits, a gas combustion tower inlet connected to the waste gas outlet of the above-mentioned furnace body, and a gas combustion tower outlet connected to the combustion gas inlet of the above-mentioned heating shaft.

2. The apparatus of claim 1 wherein the furnace body is a vertical, cylindrical shape, and is provided with upper and lower tuyeres, a sliding-gate-type molten iron tapping nozzle at or near the bottom of the furnace body, and a taphole, on the side of the furnace, as a slag waste outlet.

3. The apparatus of claims 1 wherein the furnace body is slidable horizontally under the heating shaft in a manner so that it may be moved out from that position so that two furnace bodies may be used interchangeably to carry out melting and maintenance.

4. The apparatus of claim 1 wherein a ladle is provided on a movable flatcar under a furnace body to receive molten iron.

5. The apparatus of claim 1 further comprising a conveyor belt above the raw material bucket for charging raw material into the raw material bucket.

* * * * *